US010599294B2

(12) United States Patent
Khiani et al.

(10) Patent No.: US 10,599,294 B2
(45) Date of Patent: Mar. 24, 2020

(54) SYSTEM AND METHOD FOR TRANSFERRING IMAGES TO MULTIPLE PROGRAMMABLE SMART THERMOSTATS

(71) Applicant: Lennox Industries Inc., Richardson, TX (US)

(72) Inventors: Sunil K. Khiani, Plano, TX (US); Sridharan Shanmugam, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 75 days.

(21) Appl. No.: 15/634,260

(22) Filed: Jun. 27, 2017

(65) Prior Publication Data
US 2018/0373401 A1 Dec. 27, 2018

(51) Int. Cl.
*G06F 3/0482* (2013.01)
*G05B 15/02* (2006.01)
*F24F 11/30* (2018.01)
*F24F 11/62* (2018.01)
*G06F 8/65* (2018.01)
(Continued)

(52) U.S. Cl.
CPC ............ *G06F 3/0482* (2013.01); *F24F 11/30* (2018.01); *F24F 11/54* (2018.01); *F24F 11/62* (2018.01); *G05B 15/02* (2013.01); *G06F 8/65* (2013.01); *H04L 12/282* (2013.01); *H04L 67/125* (2013.01); *F24F 11/63* (2018.01); *G06F 3/04883* (2013.01); *H04L 67/12* (2013.01);
(Continued)

(58) Field of Classification Search
CPC ......... G06F 3/0482; F24F 11/62; F24F 11/30; F24F 11/63; G05B 15/02
See application file for complete search history.

(56) References Cited

U.S. PATENT DOCUMENTS 6,385,510 B1   5/2002   Hoog et al.
D473,151 S    4/2003   Shaland et al.
(Continued)

FOREIGN PATENT DOCUMENTS

EP   2908206 A1   8/2015

OTHER PUBLICATIONS

U.S. Appl. No. 14/712,019, Golden et al.
(Continued)

*Primary Examiner* — Roland J Casillas
(74) *Attorney, Agent, or Firm* — Winstead PC

(57) ABSTRACT

A system includes a plurality of programmable intelligent thermostats positioned within at least one of a first home environment and a second home environment, a plurality of communication devices configured to operate an electronic media sharing application, and at least one server configured to communicate with the plurality of programmable intelligent thermostats and the plurality of communication devices via a wireless network. A user initiates the electronic media sharing application on at least one of the plurality of communication devices. A touch-screen display of the at least one communication device demonstrates the plurality of programmable intelligent thermostats positioned within the first and second home environments and at least one user-selected electronic media is simultaneously uploaded to at least one of the plurality of programmable intelligent thermostats responsive to a user selection of a region on the touch-screen display.

19 Claims, 9 Drawing Sheets

(51) Int. Cl.
*H04L 12/28* (2006.01)
*F24F 11/54* (2018.01)
*H04L 29/08* (2006.01)
*G06F 3/0488* (2013.01)
*F24F 11/63* (2018.01)
*H04W 4/70* (2018.01)
*H04N 21/414* (2011.01)
*H04W 4/33* (2018.01)

(52) U.S. Cl.
CPC ............ *H04N 21/414* (2013.01); *H04W 4/33* (2018.02); *H04W 4/70* (2018.02)

(56) References Cited

U.S. PATENT DOCUMENTS

| | | |
|---|---|---|
| 7,088,255 B2 | 8/2006 | Ridolfo et al. |
| D591,305 S | 4/2009 | Shimoda |
| 7,571,014 B1* | 8/2009 | Lambourne ............ H04R 27/00 700/94 |
| 8,195,313 B1 | 6/2012 | Fadell et al. |
| 8,365,074 B1 | 1/2013 | Wagner et al. |
| D676,060 S | 2/2013 | Frost et al. |
| D676,457 S | 2/2013 | Frost et al. |
| D682,850 S | 5/2013 | Del Pasqua |
| D687,057 S | 7/2013 | Plitkins |
| D687,845 S | 8/2013 | Lee |
| D690,322 S | 9/2013 | Matas et al. |
| 8,620,841 B1 | 12/2013 | Filson et al. |
| D697,076 S | 1/2014 | Oda et al. |
| D701,515 S | 3/2014 | Matas et al. |
| D701,869 S | 4/2014 | Matas et al. |
| D709,913 S | 7/2014 | Hurd |
| D722,606 S | 2/2015 | Stroupe et al. |
| D733,591 S | 7/2015 | Golden et al. |
| D734,179 S | 7/2015 | Golden et al. |
| D736,827 S | 8/2015 | Omiya |
| 9,167,368 B2 | 10/2015 | De Jong et al. |
| D742,898 S | 11/2015 | Matas et al. |
| D748,126 S | 1/2016 | Sarukkai et al. |
| D749,092 S | 2/2016 | Lee et al. |
| D755,201 S | 5/2016 | Kim |
| D758,422 S | 6/2016 | Zhao |
| D759,077 S | 6/2016 | Bergmann et al. |
| D759,079 S | 6/2016 | Carlton et al. |
| D760,246 S | 6/2016 | Birks et al. |
| D761,297 S | 7/2016 | Eder |
| D763,868 S | 8/2016 | Lee et al. |
| D767,586 S | 9/2016 | Kwon et al. |
| D775,658 S | 1/2017 | Luo et al. |
| D777,744 S | 1/2017 | Wang et al. |
| D781,327 S | 3/2017 | Conze et al. |
| D783,046 S | 4/2017 | Dzjind et al. |
| D783,672 S | 4/2017 | Rajasankar et al. |
| D785,017 S | 4/2017 | Wang et al. |
| D786,269 S | 5/2017 | Lin et al. |
| D786,278 S | 5/2017 | Motamedi |
| D787,551 S | 5/2017 | Oh et al. |
| 2003/0070437 A1 | 4/2003 | Hafner et al. |
| 2003/0076745 A1 | 4/2003 | Chapman |
| 2005/0234807 A1 | 10/2005 | Toffey |
| 2007/0136679 A1 | 6/2007 | Yang |
| 2007/0241203 A1 | 10/2007 | Wagner et al. |
| 2009/0079765 A1 | 3/2009 | Hoover |
| 2009/0171970 A1* | 7/2009 | Keefe .................... G06Q 10/10 |
| 2010/0025483 A1 | 2/2010 | Hoeynck et al. |
| 2010/0036560 A1 | 2/2010 | Wright et al. |
| 2010/0070085 A1 | 3/2010 | Harrod et al. |
| 2010/0070089 A1 | 3/2010 | Harrod et al. |
| 2010/0149096 A1* | 6/2010 | Migos .................. G06F 3/0425 345/158 |
| 2011/0015802 A1 | 1/2011 | Imes |
| 2011/0046792 A1 | 2/2011 | Imes et al. |
| 2011/0131610 A1 | 6/2011 | Lee et al. |
| 2011/0157046 A1 | 6/2011 | Lee et al. |
| 2011/0202185 A1 | 8/2011 | Imes et al. |
| 2012/0064923 A1 | 3/2012 | Imes et al. |
| 2012/0085831 A1 | 4/2012 | Kopp |
| 2012/0124520 A1 | 5/2012 | Samp et al. |
| 2012/0130547 A1 | 5/2012 | Fadell et al. |
| 2012/0131504 A1 | 5/2012 | Fadell et al. |
| 2012/0179300 A1 | 7/2012 | Warren et al. |
| 2012/0203379 A1 | 8/2012 | Sloo et al. |
| 2012/0239221 A1* | 9/2012 | Mighdoll ........... G05D 23/1902 700/300 |
| 2012/0259470 A1 | 10/2012 | Nijhawan et al. |
| 2012/0274662 A1 | 11/2012 | Kim et al. |
| 2013/0147723 A1 | 6/2013 | Bias et al. |
| 2013/0151016 A1 | 6/2013 | Bias et al. |
| 2013/0159849 A1 | 6/2013 | Lee et al. |
| 2013/0173064 A1 | 7/2013 | Fadell et al. |
| 2013/0245837 A1 | 9/2013 | Grohman |
| 2014/0126425 A1 | 5/2014 | Burd et al. |
| 2014/0211985 A1 | 7/2014 | Polese et al. |
| 2014/0216078 A1 | 8/2014 | Ladd |
| 2014/0319232 A1 | 10/2014 | Gourlay et al. |
| 2014/0359453 A1* | 12/2014 | Palfreennan ........ G06F 3/04847 715/731 |
| 2014/0365019 A1 | 12/2014 | Gourlay et al. |
| 2015/0051741 A1 | 2/2015 | Bruck et al. |
| 2015/0100508 A1 | 4/2015 | Binion et al. |
| 2015/0127174 A1 | 5/2015 | Quam et al. |
| 2015/0167995 A1 | 6/2015 | Fadell et al. |
| 2015/0261427 A1* | 9/2015 | Sasaki ................. G06F 3/04817 715/736 |
| 2015/0308705 A1 | 10/2015 | Sloo et al. |
| 2016/0189491 A1 | 6/2016 | Sloo et al. |
| 2016/0201933 A1 | 7/2016 | Hester et al. |
| 2017/0074541 A1 | 3/2017 | Bentz et al. |
| 2017/0082309 A1 | 3/2017 | Tanaka |
| 2017/0211862 A1 | 7/2017 | Slack et al. |

OTHER PUBLICATIONS

U.S. Appl. No. 14/712,030, Golden et al.
U.S. Appl. No. 14/711,938, Golden et al.
U.S. Appl. No. 29/535,235, Golden et al.
U.S. Appl. No. 29/535,236, Golden et al.
Energy Efficient Smart Thermostat: Nest, designboom.com [online], published Oct. 26, 2011, [retrieved May 24, 2016], retrieved from the Internet <URL:http://www.designboom.com/technology/energyefficientsmartthermostatnest/>.
Lennox iComfort S30, contractingbusiness.com [online], published Mar. 13, 2015, [retrieved May 24, 2016], retrieved from the Internet <URL:http://contractingbusiness.com/residential-hvac/tech-update-march-2015-hydronics-home-automation#slide-0-field_images-32371>.
Nest Smart Thermostat, design-milk.com [online], published Oct. 25, 2011, [retrieved May 24, 2016], retrieved from the Internet <URL:http://design-milk.com/nest-smart-thermostat/>.
Innovative Retail Technologies; "Venstar ColorTouch Thermostats Now Feature Real-Time Weather, Remote Firmware Upgrades and Humidity Support"; https://www.innovativeretailtechnologies.com/doc/venstar-colortouch-feature-real-time-weather-remote-firmware-support-0001; Jun. 13, 2013; 4 pages.
National Oceanic and Atmospheric Administration (NOAA); "National Digital Forecast Database (NDFD)"; https://www.ncdc.noaa.gov/data-access/model-data/model-datasets/national-digital-forecast-database-ndfd; Nov. 2015; 3 pages.
U.S. Appl. No. 16/019,784, Brahme et al.

* cited by examiner

SYSTEM AND METHOD FOR TRANSFERRING IMAGES TO MULTIPLE PROGRAMMABLE SMART THERMOSTATS

BACKGROUND

Technical Field

The present invention relates generally to devices configured to regulate operation of one or more of mechanical, electrical, and electronic systems in relation to temperature and, more particularly, but not by way of limitation, to a method of and system for controlling operation of heating, ventilation, and air conditioning (HVAC) and refrigeration systems and uploading electronic media for viewing on a display of a programmable intelligent thermostat.

History of Related Art

A thermostat is generally considered to be a device that regulates operation of mechanical, electrical, or electronic systems in relation to temperature. Thermostats are particularly prevalent in heating/cooling systems to deliver a set temperature result. A traditional thermostat display typically demonstrates current temperature settings, desired temperature settings, current time, and the like. However, traditional thermostats do not demonstrate additional information that users may be interested in. For example, users may have to look or step outside to get an indication of outside weather conditions. In addition, traditional thermostats lack an easy-to-use and intuitive user interface.

BRIEF SUMMARY OF THE INVENTION

A system includes a plurality of programmable intelligent thermostats positioned within at least one of a first home environment and a second home environment, a plurality of communication devices configured to operate an electronic media sharing application, and at least one server configured to communicate with the plurality of programmable intelligent thermostats and the plurality of communication devices via a wireless network. A user initiates the electronic media sharing application on at least one of the plurality of communication devices. A touch-screen display of the at least one communication device demonstrates the plurality of programmable intelligent thermostats positioned within the first and second home environments and at least one user-selected electronic media is simultaneously uploaded to at least one of the plurality of programmable intelligent thermostats responsive to a user selection of a region on the touch-screen display.

A method includes positioning a plurality of programmable intelligent thermostats within a first home environment and a second home environment, operating an electronic media sharing application on at least one of a plurality of communication devices, and initiating by a user, the electronic media sharing application on at least one of the plurality of communication devices. The method further includes demonstrating, on a touch-screen display of the at least one of the plurality of communication devices, the plurality of programmable intelligent thermostats positioned within the first and second home environments and simultaneously uploading at least one user-selected electronic media to at least one of the plurality of programmable intelligent thermostats responsive to a user selection of a region on the touch-screen display.

A system includes a plurality of programmable intelligent thermostats positioned within at least one of a first home environment and a second home environment, a plurality of communication devices configured to operate an electronic media sharing application, and at least one server configured to communicate with the plurality of programmable intelligent thermostats and the plurality of communication devices via a wireless network. A user initiates the electronic media sharing application on at least one of the plurality of communication devices. A touch-screen display of the at least one communication device demonstrates the plurality of programmable intelligent thermostats positioned within the first and second home environments and at least one electronic image tagged by the user on social media websites is simultaneously uploaded to at least one of the plurality of programmable intelligent thermostats responsive to a user selection of a region on the touch-screen display.

DETAILED DESCRIPTION OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
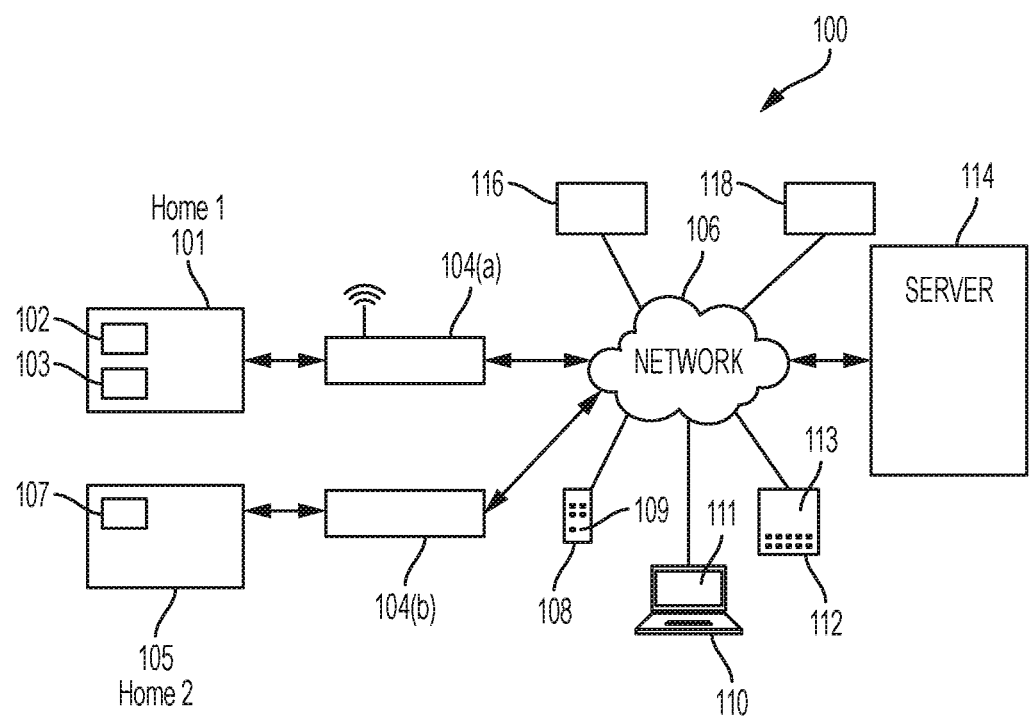
FIG. 1 is a schematic view illustrating a smart home environment system.

FIG. 1 is a schematic view illustrating a smart home environment system 100. The smart home environment system 100 includes a plurality of programmable intelligent thermostats 102, 103, 107, a plurality of networking devices 104(a), 104(b), a plurality of communication devices 108, 110, 112, and at least one server or cloud-computing system 114. For illustrative purposes, the plurality of programmable intelligent thermostats 102, 103 are positioned within a first home environment 101 and the programmable intelligent thermostat 107 is positioned within a second home environment 105; however, in other embodiments, the number and placement of the plurality of programmable intelligent thermostats 102, 103, 107 can vary as needed. The plurality of networking devices 104(a), 104(b), the plurality of communication devices 108, 110, 112, and the at least one server or cloud-computing system 114 are each communicably coupled to a network 106. Each of the plurality of communication devices 108, 110, 112 includes a display 109, 111, 113. In some embodiments, the display 109, 111, 113 may be, for example, a customizable color touch-screen display and may be configured to display respective representations of the keyboard (e.g., a virtual keyboard). The network 106 can include any number of wired and/or wireless communications networks such as, for example, public or private intranets, a wide area network (e.g., the Internet), cellular networks, satellite communication, and the like. In refrigeration system environments (not illustrated), the plurality of programmable intelligent thermostats 102, 103 may be positioned within a first site and the programmable intelligent thermostat 107 may be positioned within a second site.

In a typical embodiment, the plurality of networking devices 104(*a*), 104(*b*) serve as networking equipment that, for example, routes/forwards traffic between two or more networks or sub-networks and/or provides access to a network. For example, the plurality of networking devices 104(*a*). 104(*b*) allow the plurality of programmable intelligent thermostats 102, 103, 107 to communicate with the at least one server or cloud-computing system 114 via the network 106. In a typical embodiment, the plurality of networking devices 104(*a*), 104(*b*) can include, for example, routers, switches, bridges, hubs, wireless access points, gateways, a combination of same, and/or the like. In a typical embodiment, the plurality of networking devices 104(*a*). 104(*b*) are further configured to communicate with home communication equipment such as, for example, home routers, wireless hubs, access points, and the like. In a typical embodiment, the at least one server or cloud-computing system 114 may be associated with a manufacturer, a support entity, a service provider, and the like. The at least one server or cloud-computing system 114 is configured to communicate with other entities such as, for example, maintenance contractors 116, weather forecasting agencies 118, and the like.

The smart home environment system 100 allows users to contact customer support using, for example, the programmable intelligent thermostats 102, 103, 107. Additionally, the smart home environment system 100 allows software updates to be routinely sent from the at least one server or cloud-computing system 114 to at least one of the plurality of programmable intelligent thermostats 102, 103, 107 and other HVAC system components such as, for example, outdoor-unit control board, furnace control board, and the like. Furthermore, the smart home environment system 100 allows maintenance contractors 116 to periodically send HVAC system maintenance reminders, HVAC system service special, and other notifications to the programmable intelligent thermostats 102, 103, 107 via the at least one server or cloud-computing system 114. In addition, via the smart home environment system 100, the at least one server or cloud-computing system 114 forwards current and predicted weather information to the programmable intelligent thermostats 102, 103, 107.

In a typical embodiment, the plurality of communication devices 108, 110, 112 operated by users are configured to control the programmable intelligent thermostat 102 remotely. A webpage or mobile application may be configured to receive information from the user operated plurality of communication devices 108, 110, 112 and control settings of, for example, the programmable intelligent thermostat 102. For example, the user can view temperature settings of the programmable intelligent thermostat 102 and modify the settings using the plurality of communication devices 108, 110, 112. In some embodiments, the plurality of communication devices 108, 110, 112 operated by users are configured to simultaneously upload electronic media to at least one of the plurality of programmable intelligent thermostats 102, 103, 107. In a typical embodiment, the plurality of communication devices 108, 110, 112 may be, for example, a personal computer (e.g., desktop or laptop), tablet computer, mobile device (e.g., personal digital assistant (PDA) or smart phone), and the like. In some embodiments, the plurality of communication devices 108, 110, 112 may function as an image repository where electronic media is stored. The at least one server or cloud-computing system 114 can be programmed to collect electronic media from the plurality of communication devices 108, 110, 112 and upload the electronic media to the plurality of programmable intelligent thermostats 102, 103, 107. In other embodiments, the image repository can be a network accessible image repository. The network accessible image repository may be a social media website such as, for example. Facebook®, Instagram®. Whatsapp®, and the like.

For purpose of this patent application, electronic media refers to a textual, graphical, audio, and/or a video file. An example of the electronic media is an electronic image or a video file. In some embodiments, the electronic media comprises static images. In other embodiments, the electronic media comprises dynamic images such as, for example, animated GIF. Flash animation, and the like.

Figure 2A:
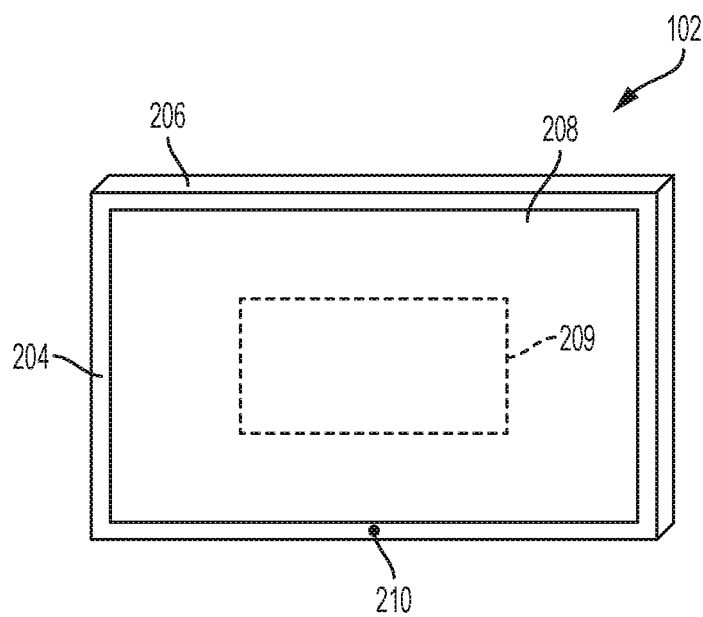
FIG. 2A illustrates an exemplary programmable intelligent thermostat.

FIG. 2A illustrates an exemplary programmable intelligent thermostat 102. The programmable intelligent thermostat 102 includes a front housing 204 and a rear housing 206. The rear housing 206 is removably attached to a wall via fasteners (not illustrated), such as, for example, screws, nuts, snaps, pins, and the like. The front housing 204 includes a display 208, processing circuitry 209, and at least one sensor 210 embedded therein. In a typical embodiment, the at least one sensor 210 may be, for example, a temperature sensor. In one embodiment, a video camera is incorporated in the programmable intelligent thermostat 102 to perform operations such as, for example, room lighting determination, distance determination, facial detection, voice recognition, occupancy detection, and the like.

In a typical embodiment, the display 208 may be any type of visual input/output configured to display one or more characters and/or receive input corresponding to one or more characters. In addition, the display 208 may be configured to display, for example, diagrams, images, words, characters, animations, and the like. The display 208 may further be configured to receive input corresponding to one or more diagrams, images, words, characters, and the like. In some embodiments, the display 208 may be, for example, a customizable color touch-screen display and may be configured to display respective representations of the keyboard (e.g., a virtual keyboard). In some embodiments, the display 208 may function as, for example, a user interface for receiving user inputs. For exemplary illustration, the programmable intelligent thermostat 102 as illustrated in FIG. 2A is rectangular in shape; however, in other embodiments, the programmable intelligent thermostat 102 may be of various shapes and sizes as needed.

Figure 2B:
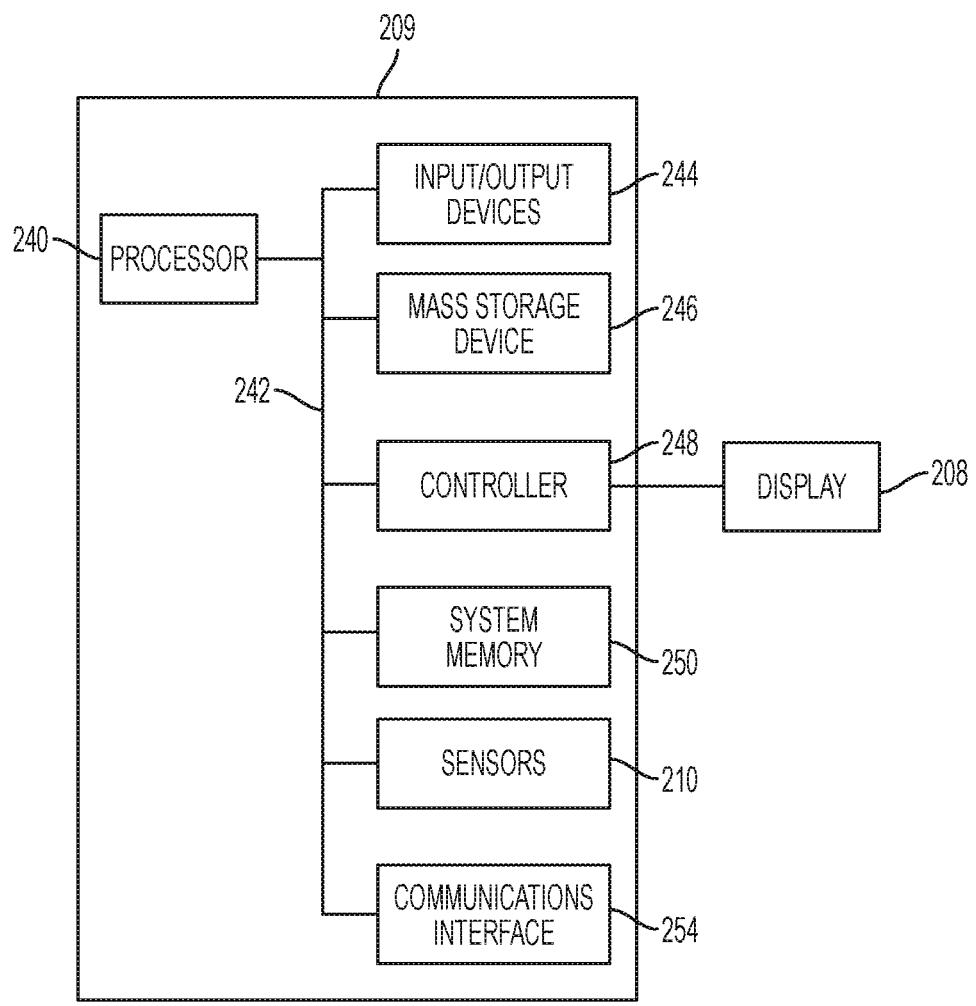
FIG. 2B is a schematic view illustrating processing circuitry of the programmable intelligent thermostat.

FIG. 2B is a schematic view illustrating the processing circuitry 209. For illustrative purposes, the processing circuitry 209 will be described relative to FIGS. 1-2A. The processing circuitry 209 includes a processor 240 connected to a bus 242. The bus 242 serves as a connection channel between the processor 240 and various components of the programmable intelligent thermostat 102. The bus 242 may include any combination of hardware, software embedded in a computer readable medium, and/or encoded logic incorporated in hardware or otherwise stored (e.g., firmware) to couple components of the processing circuitry 209 to each other. As an example and not by way of limitation, the bus 242 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. The bus 242 may include any number, type, and/or configuration of buses 242, where appropriate. In particular embodiments, one or more buses 242 (which may each include an address bus and a data bus) may couple the processor 240 to other components of the processing circuitry 209.

User input/output devices 244 are coupled to the processor 240. Examples of input/output devices 244 may include, for example, touchscreens, pointing trackballs, trackpads, and a variety of other input/output devices. Programs and data are stored on a mass storage device 246 coupled to the processor 240.

As an example and not by way of limitation, the mass storage device 246 may include a hard disk drive (HDD), a floppy disk drive, flash memory, an optical disc, a magneto-optical disc, magnetic tape, or a Universal Serial Bus (USB) drive or a combination of two or more of these. The mass storage device 246 may include removable or non-removable (or fixed) media, where appropriate. The mass storage device 246 may be internal or external to the programmable intelligent thermostat 102, where appropriate. In particular embodiments, the mass storage device 246 may be non-volatile, solid-state memory. In particular embodiments, the mass storage device 246 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The mass storage device 246 may take any suitable physical form and may comprise any suitable number or type of storage. The mass storage device 246 may include one or more storage control units facilitating communication between the processor 240 and the mass storage device 246, where appropriate.

The display 208 is coupled to the processor 240 by a controller 248. A system memory 250 is coupled to the processor 240 to provide the processor 240 with fast storage to facilitate execution by the processor 240. The system memory 250 may be any form of volatile or non-volatile memory including, without limitation, magnetic media, optical media, random access memory (RAM), read-only memory (ROM), flash memory, removable media, or any other suitable local or remote memory component or components. In particular embodiments, the system memory 250 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. The system memory 250 may store any suitable data or information, including software embedded in a computer readable medium, and/or encoded logic incorporated in hardware or otherwise stored (e.g., firmware). In particular embodiments, the system memory 250 may include main memory for storing instructions for the processor 240 to execute or data for the processor 240 to operate on.

The at least one sensor 210 is coupled to the processor 240 and provides information to the processor 240. The information may include data relative to, for example, room lighting determination, distance determination, facial detection, voice recognition, occupancy detection, and the like. The processing circuitry 209 also includes a communications interface 254. In a typical embodiment, the communications interface 254 may include hardware, encoded software, or both providing one or more interfaces for communication (such as, for example, packet-based communication) among any networks, any network devices, and/or any other computer systems. As an example and not by way of limitation, the communications interface 254 may include a network-interface controller (NIC) or network adapter for communicating with an Ethernet or other wire-based network and/or a wireless NIC (WNIC) or wireless adapter for communicating with a wireless network.

Depending on the embodiment, the communications interface 254 may be any type of interface suitable for any type of network for which the programmable intelligent thermostat 102 is used. As an example and not by way of limitation, the programmable intelligent thermostat 102 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the programmable intelligent thermostat 102 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the communications interface 254 can utilize communication via various other types of wireless communication such as infrared (IR) communication, radio frequency (RF) communication, communication via direct electrical connections, etc. In general, the processing circuitry 209 may include any suitable communications interface 254 for any one or more of these networks, where appropriate.

In a typical embodiment, the processor 240 may be a microprocessor, controller, or any other suitable computing device, resource, or combination of hardware, software and/or encoded logic operable to execute, either alone or in conjunction with other components, (e.g., the system memory 250). Such functionality may include providing various features discussed herein. In particular embodiments, the processor 240 may include hardware for executing instructions. As an example and not by way of limitation, to execute instructions, the processor 240 may retrieve (or fetch) instructions from an internal register, an internal cache, the system memory 250, or the mass storage device 246; decode and execute them; and then write one or more results to an internal register, an internal cache, the system memory 250, or the mass storage device 246.

Thermostat displays have the capability of displaying electronic images as a screen saver when no user activity is sensed for a certain period of time. Traditionally, in a home having a plurality of thermostats, a user is required to individually perform steps to upload electronic images to each one of the plurality of thermostats making the process cumbersome. However, traditional method and systems do not have the capability of simultaneously uploading electronic images to multiple thermostats. In a typical embodiment, the exemplary method and system is capable of simultaneously uploading electronic images to multiple thermostats such as, for example, the plurality of programmable intelligent thermostats 102, 103, and 107. In a typical embodiment, the exemplary methods and system can be facilitated utilizing mobile applications that can be installed on the plurality of communication devices 108, 110, 112. A mobile application includes a graphical user interface (GUI) on a display 109, 111, 113 of the plurality of communication devices 108, 110, 112. The mobile application can be programmed to perform various functions such as, for example, controlling operation of at least one of the plurality of programmable intelligent thermostats 102, 103, 107, uploading electronic images to at least one of the plurality of programmable intelligent thermostats 102, 103, 107, and the like.

In a typical embodiment, the electronic images that are uploaded from the at least one server or cloud-computing system 114 may be displayed on the display 208 as a background image (i.e. wallpaper image), an image on only part of the display 208, as a sequence of slide show images, a screensaver image, a scrolling text line image, and/or any other suitable image as desired. The electronic images may include still images, video images, text images, computer generated images, flash player images, or any other suitable image or image sequence, as desired. The electronic images may be in a JPEG, GIF, BMP, TIFF, PNG, WMF, PCX, MPEG, SWF (Adobe Flash), SCR (Windows™ Screen Saver Format), or any other suitable format. The display 208 is configured to automatically convert the electronic images to screen resolution and appropriate display format.

FIGS. 3A-3D illustrate screen shots of a process for simultaneously uploading electronic images to multiple programmable intelligent thermostats from a user account. For illustrative purposes, the process will be described relative to FIGS. 1-2B. A user is initially required to set up an account and register the plurality of programmable intelligent thermostats 102, 103, 107 and their locations with the at least one server or cloud-computing system 114 that is associated with the manufacturer. For example, as illustrated in FIG. 1, the first home environment 101 comprises the plurality of programmable intelligent thermostats 102, 103 and the second home environment 105 comprises the programmable intelligent thermostat 107. The first and second home environments 101, 105 and the plurality of programmable intelligent thermostats 102, 103, 107 are registered with the at least one server or cloud-computing system 114 and their operation controlled by the user using, for example, the mobile application.

Figure 3A:
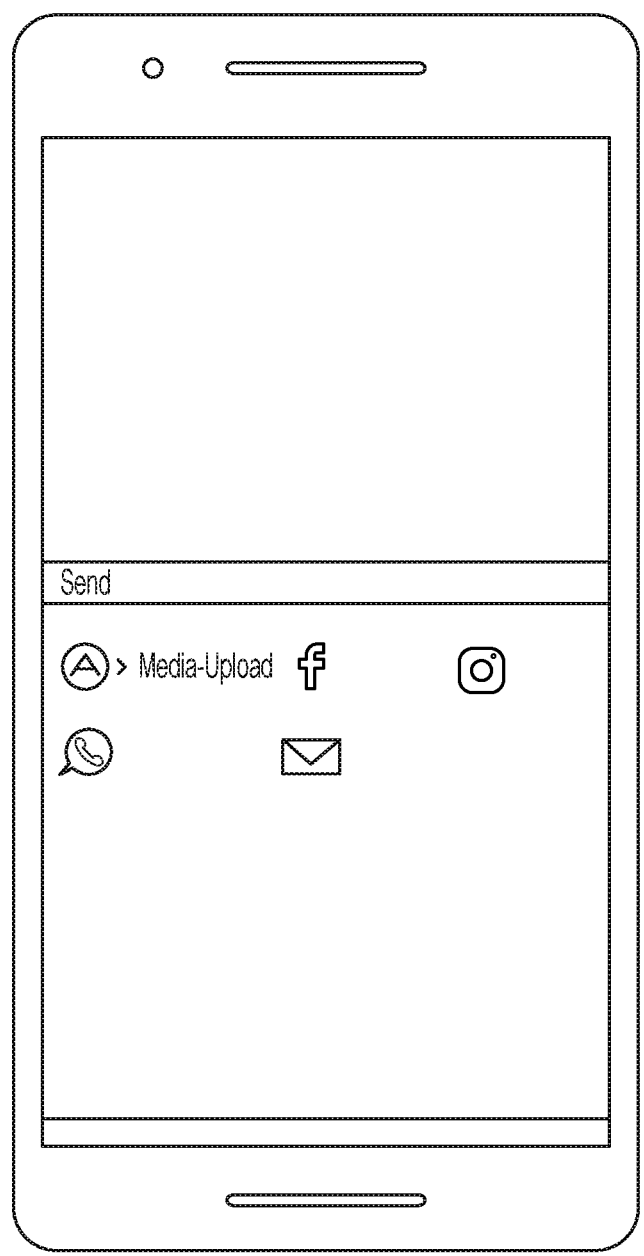
FIGS. 3A-3D illustrate screen shots of an exemplary process for simultaneously uploading electronic images to multiple programmable intelligent thermostats.
Figure 3B:
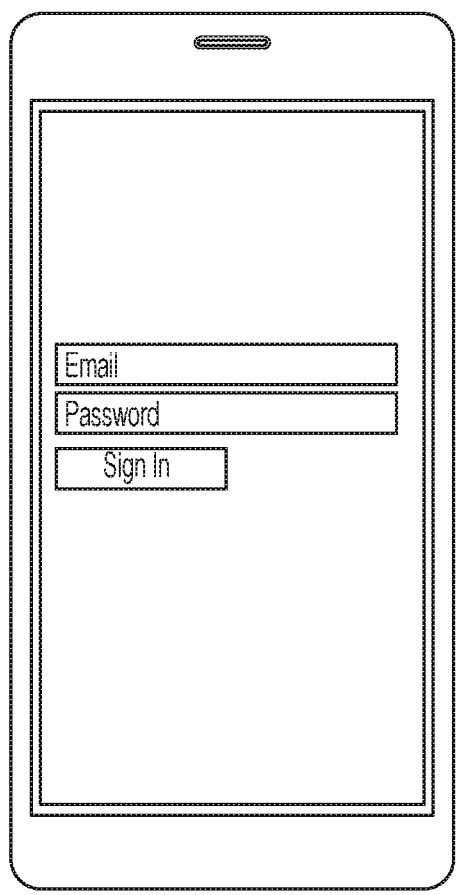
Figure 3C:
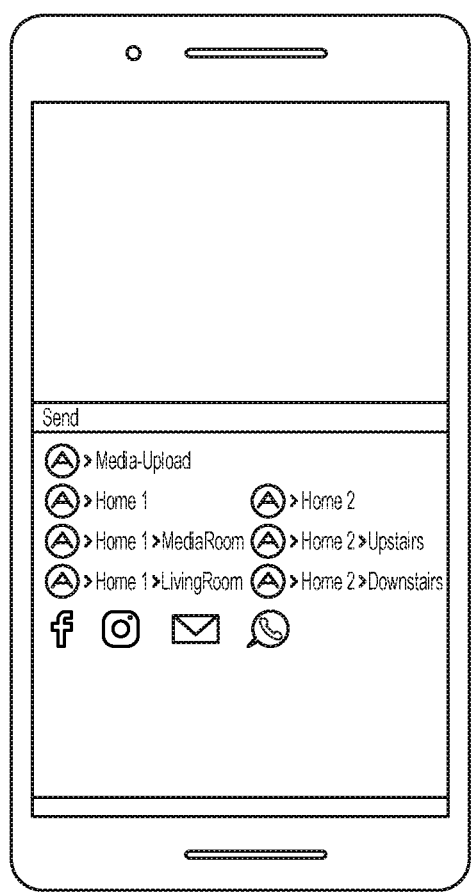
Figure 3D:
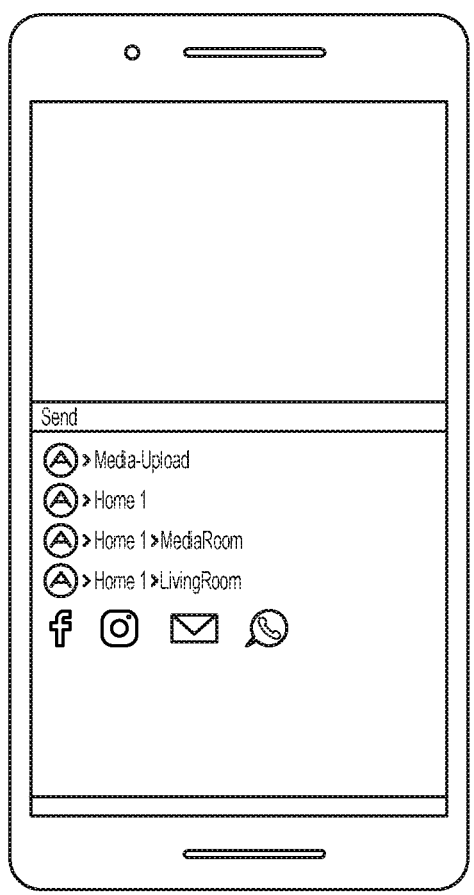

When a user opens the exemplary mobile application on at least one of the plurality of communication devices 108, 110, 112, the user is shown various options for uploading electronic images as shown in FIG. 3A. In one embodiment, the user can upload electronic images using a media-upload option provided by the HVAC system manufacturer. In other embodiments, a plurality of social media links such as, for example, Facebook®, Instagram®, Whatsapp®, and the like are provided that can be selected for uploading electronic images. The social media links enable the user to retrieve electronic images from the user's social media accounts. In yet another embodiment, a link to electronic mail (E-mail) is provided that can be selected to upload electronic images. Upon choosing a desired option, the user is required to perform authentication steps to confirm their identity. In the embodiment illustrated in FIG. 3B, the user is required to sign in by entering an E-mail address and a password. In alternate embodiments, user authentication can be performed by entering a user name and password, a voice print, a thumb print or other biometrics. In the illustrated embodiment, the user selects the media-upload option provided by the HVAC system manufacturer. Next, in an embodiment illustrated in FIG. 3C, the user is provided a menu showing multiple registered homes, the plurality of registered programmable intelligent thermostats and the location of each of the plurality of registered programmable intelligent thermostats within the multiple registered homes. In another embodiment illustrated in FIG. 3D, the user is provided a menu showing a single registered home, the plurality of registered programmable intelligent thermostats and the location of each of the plurality of registered programmable intelligent thermostats within the single registered home.

Figure 4A:
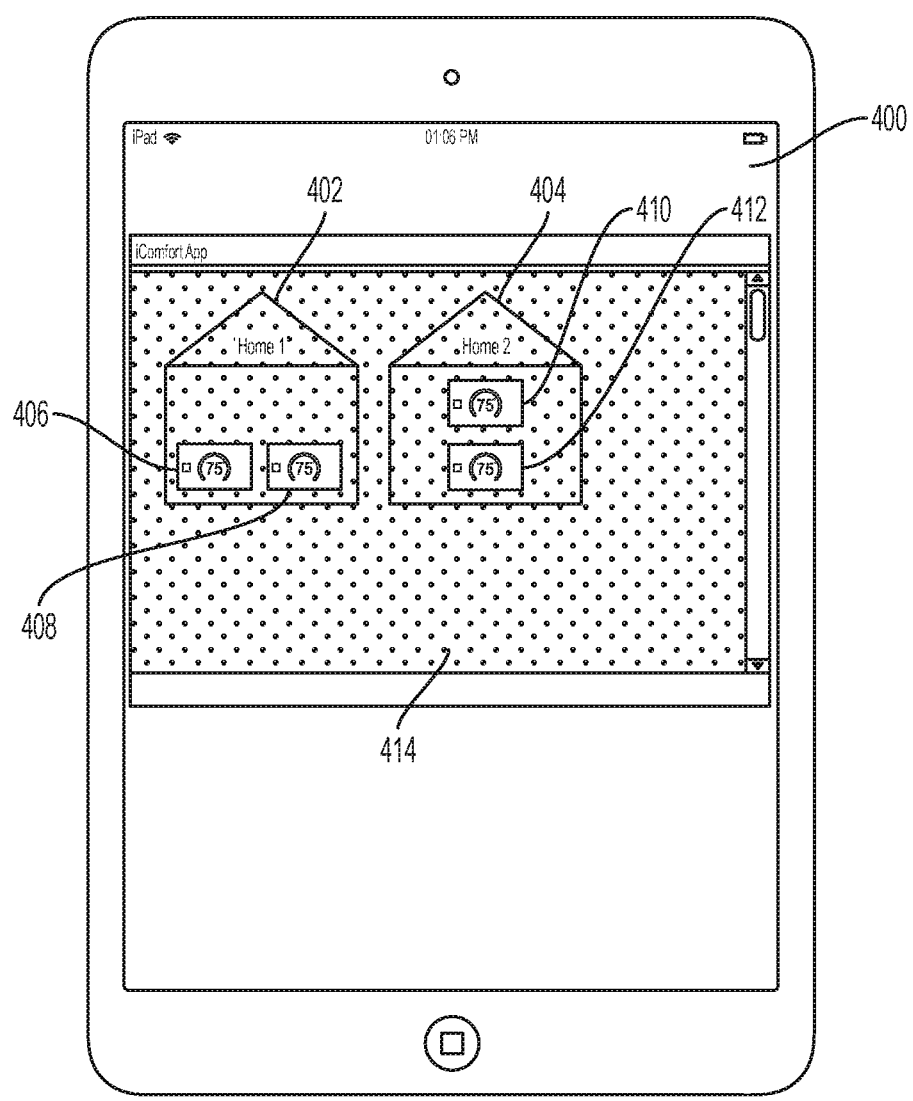
FIG. 4A illustrates a screenshot of a graphical user interface (GUI) for simultaneously uploading electronic images to multiple programmable intelligent thermostats positioned within multiple home environments.

FIG. 4A illustrates a screenshot of a GUI 400 for simultaneously uploading electronic images to multiple programmable intelligent thermostats positioned within multiple home environments. For illustrative purposes, the processing circuitry 209 will be described relative to FIGS. 1-2A. The GUI 400 displays previously registered home environments associated with the user account and the plurality of programmable intelligent thermostats within the previously registered home environments. In the embodiment illustrated in FIG. 4A, a plurality of programmable intelligent thermostats 406, 408 are positioned within a first home environment 402 and a plurality of programmable intelligent thermostats 410 and 412 are positioned within a second home environment 404. When a user swipes or taps on a region 414 outside of the first and second home environments 402, 404, the entire region 414 is highlighted to indicate that the electronic images will be simultaneously transmitted to all of the plurality of programmable intelligent thermostats 406, 408, 410, 412 using a single swipe or tap.

Figure 4B:
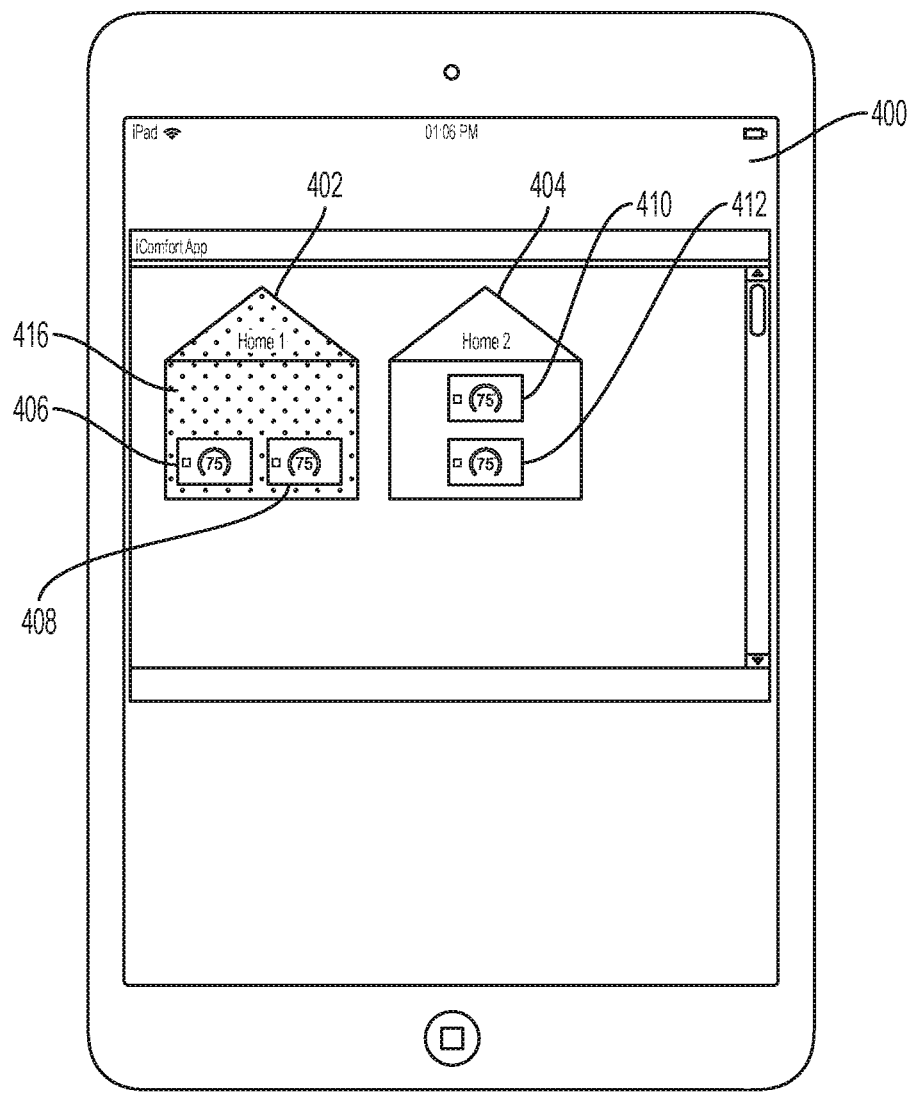
FIG. 4B illustrates a screenshot of a GUI for simultaneously uploading electronic images to multiple programmable intelligent thermostats positioned within a single home environment.

FIG. 4B illustrates a screenshot of a GUI 400 for simultaneously uploading electronic images to multiple programmable intelligent thermostats positioned within a single home environment. For illustrative purposes, the processing circuitry 209 will be described relative to FIGS. 1-2A. The GUI 400 displays previously registered home environments and the plurality of programmable intelligent thermostats within the previously registered home environments. In the embodiment illustrated in FIG. 4B, a plurality of programmable intelligent thermostats 406, 408 are positioned within a first home environment 402 and a plurality of programmable intelligent thermostats 410 and 412 are positioned within a second home environment 404. When a user swipes or taps on a region 416 inside of the first home environment 402 and outside of the plurality of programmable intelligent thermostats 406, 408, the entire first home environment 402 is highlighted to indicate that the electronic images will be simultaneously transmitted to all of the plurality of programmable intelligent thermostats 406, 408 within the first home environment 402 using a single swipe or tap.

Figure 4C:
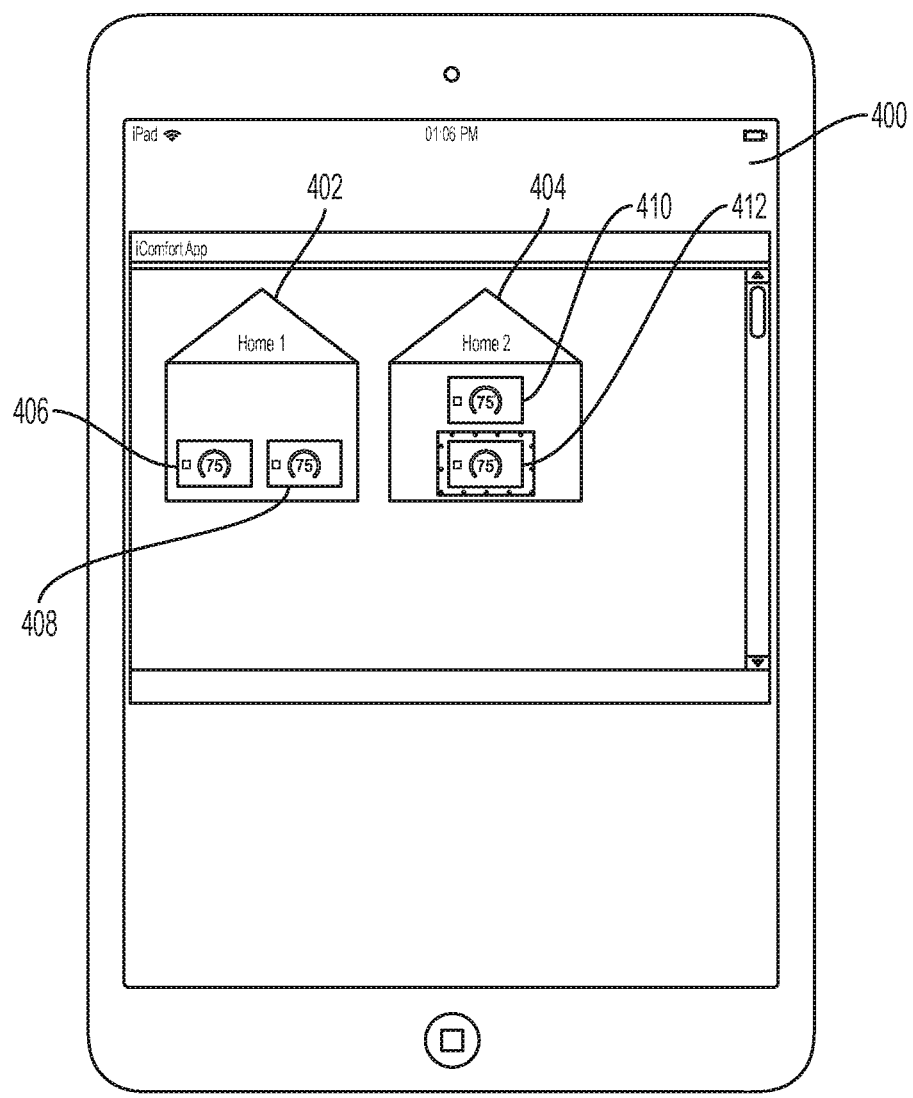
FIG. 4C illustrates a screenshot of a GUI for uploading electronic images to a single programmable intelligent thermostat positioned within a home environment.

FIG. 4C illustrates a screenshot of a GUI 400 for uploading electronic images to a single programmable intelligent thermostat positioned within a home environment. For illustrative purposes, the processing circuitry 209 will be described relative to FIGS. 1-2A. The GUI 400 displays previously registered home environments and the plurality of programmable intelligent thermostats within the previously registered home environments. In the embodiment illustrated in FIG. 4C, a plurality of programmable intelligent thermostats 406, 408 are positioned within a first home environment 402 and a plurality of programmable intelligent thermostats 410 and 412 are positioned within a second home environment 404. When a user swipes or taps on a programmable intelligent thermostat, only the selected programmable intelligent thermostat 412 is highlighted to indicate that the electronic images will only be transmitted only to the selected programmable intelligent thermostat 412 using a single swipe or tap.

In some embodiments, the electronic images to be uploaded to at least one of the plurality of programmable intelligent thermostats 406, 408, 410, 412 are user selected. The user selected electronic images may be uploaded to the controller 248 from the at least one server or cloud-computing system 114, and the controller 248 may display the electronic images on the display 208. In other embodiments, the at least one server or cloud-computing system 114 is configured to upload electronic images from the user's social media accounts such as, for example, Facebook®. Instagram®, Whatsapp®, and the like. In particular, electronic images that have been tagged by the user to be uploaded to at least one of the plurality of programmable intelligent thermostats 406, 408, 410, 412 are uploaded to the controller 248 by the at least one server or cloud-computing system 114. In other embodiments, the user sends the electronic images via electronic mail (E-mail) with instructions to upload the electronic images to at least one of the plurality of programmable intelligent thermostats 406, 408, 410, 412. In other embodiments, the plurality of programmable intelligent thermostats 406, 408, 410, 412 include a universal serial bus interface (USB) for uploading the electronic images.

Figure 5:
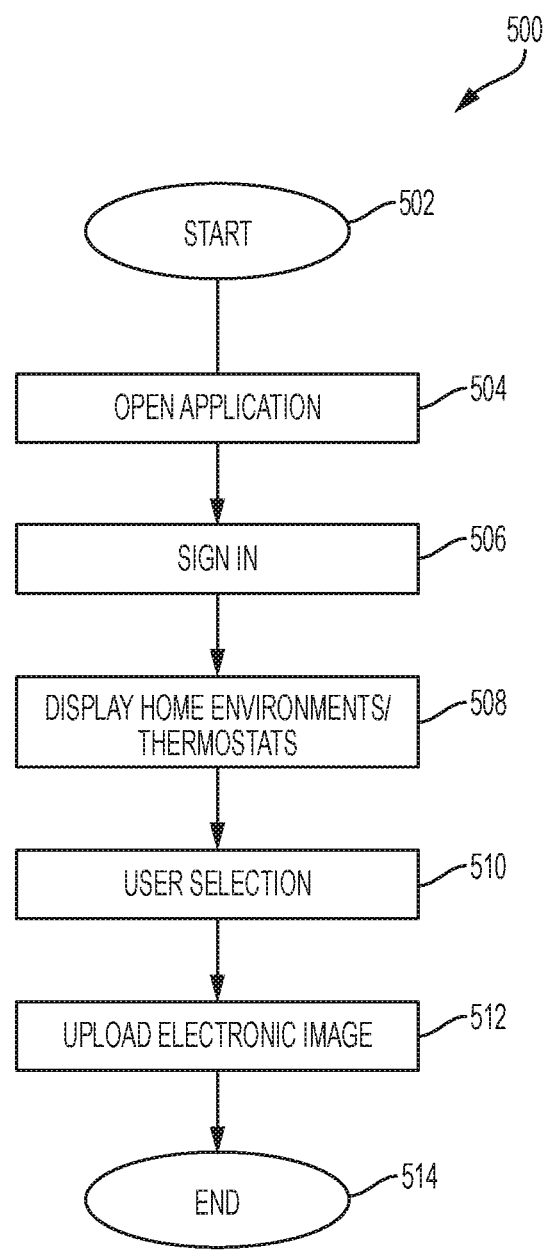
FIG. 5 is a flow chart illustrating a process for uploading electronic images to at least one programmable intelligent thermostat.

FIG. 5 is a flow chart illustrating a process 500 for uploading electronic images to at least one programmable intelligent thermostat. For illustrative purposes, the process 500 will be described relative to FIGS. 1-4C. The process 500 starts at step 502. At step 504, a user opens the exemplary mobile application on at least one of the plurality of communication devices 108, 110, 112 and is shown various options for uploading electronic images. In one embodiment, the user can upload electronic images using a media-upload option provided by the HVAC system manufacturer. In other embodiments, a plurality of social media links such as, for example, Facebook®, Instagram®, Whatsapp®, and the like can be utilized for uploading electronic images. In yet another embodiment, a link to electronic mail (E-mail) is provided that can be selected to upload electronic images. At step 506, the user is required to sign in by entering an E-mail address and a password. At step 508, the user is provided a menu showing multiple registered homes, a plurality of registered programmable intelligent thermostats and the location of each of the plurality of registered programmable intelligent thermostats within the multiple registered homes.

At step 510, the user performs a selection to upload electronic media to at least one programmable intelligent thermostat. In a typical embodiment, the user selection is performed via a GUI 400 that is displayed on a display of at least one of the plurality of communication devices 108, 110, 112. The GUI 400 displays previously registered home environments and the plurality of programmable intelligent thermostats within the previously registered home environments. For example, a plurality of programmable intelligent thermostats 406, 408 are positioned within a first home environment 402 and a plurality of programmable intelligent thermostats 410 and 412 are positioned within a second home environment 404. When a user swipes or taps on an region 414 outside of the first and second home environments 402, 404, the entire region 414 is highlighted to indicate that the electronic images will be simultaneously transmitted to all of the plurality of programmable intelligent thermostats 406, 408, 410, 412 simultaneously using a single swipe or tap. When a user swipes or taps on a region 415 inside of the first home environment 402 and outside of the plurality of programmable intelligent thermostats 406, 408, the entire first home environment 402 is highlighted to indicate that the electronic images will be transmitted simultaneously to all of the plurality of programmable intelligent thermostats 406, 408 within the first home environment 402 using a single swipe or tap. When a user swipes or taps on a programmable intelligent thermostats, only the selected programmable intelligent thermostat 412 is highlighted to indicate that the electronic images will only be transmitted to the selected programmable intelligent thermostat 412 using a single swipe or tap. At step 512, the electronic media is uploaded based upon the user selection. At step 514, the process 500 ends.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the processor 240, one or more portions of the system memory 250, one or more portions of the mass storage device 246, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML). JavaScript Object Notation (JSON), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A system comprising:
a plurality of programmable intelligent thermostats positioned within at least one of a first home environment and a second home environment;
a plurality of communication devices configured to operate an electronic media sharing application;
at least one server configured to communicate with the plurality of programmable intelligent thermostats and the plurality of communication devices via a wireless network;
wherein a user initiates the electronic media sharing application on at least one of the plurality of communication devices and is provided options for uploading at least one user-selected electronic media;
wherein a touch-screen display of at least one communication device demonstrates the plurality of programmable intelligent thermostats positioned within the first and second home environments;
wherein the at least one user-selected electronic media is simultaneously uploaded to the plurality of programmable intelligent thermostats responsive to a user selection of at least one region of a plurality of regions on the touch-screen display, wherein the user selection comprises a singular tap on the touch-screen display;
wherein each region of the plurality of regions designates the plurality of programmable intelligent thermostats where the at least one user-selected electronic media is uploaded.

2. The system of claim 1 wherein:
the first home environment comprises two programmable intelligent thermostats; and
the second home environment comprises two programmable intelligent thermostats.

3. The system of claim 2 wherein:
responsive to the user selection of the at least one region that is outside of the first and second home environments, the at least one user-selected electronic media is simultaneously uploaded to all the plurality of programmable intelligent thermostats registered with a user account.

4. The system of claim 2 wherein:
responsive to the user selection of the at least one region that is inside the first home environment and outside the two programmable intelligent thermostats, the at least one user-selected electronic media is simultaneously uploaded to the two programmable intelligent thermostats within the first home environment.

5. The system of claim 1, wherein the at least one user-selected electronic media comprises at least one of a textual file, a graphical file, an audio file, and a video file.

6. The system of claim 1, wherein the at least one user-selected electronic media comprises an electronic image.

7. The system of claim 1, wherein the at least one user-selected electronic media is displayed on a display of at least one of the plurality of programmable intelligent thermostats as a background image.

8. The system of claim 1, wherein the at least one user-selected electronic media is stored in an image repository.

9. The system of claim 8, wherein the image repository is network accessible.

10. The system of claim 9, wherein the network accessible image repository comprises social media websites.

11. The system of claim 10, wherein the at least one user-selected electronic media comprises electronic images tagged by the user on the social media websites.

12. The system of claim 1, wherein the at least one server is configured to transmit information received from a contractor to at least one of the plurality of programmable intelligent thermostats.

13. A method for comprising:
positioning a plurality of programmable intelligent thermostats within a first home environment and a second home environment;
operating an electronic media sharing application on at least one of a plurality of communication devices;
initiating by a user, the electronic media sharing application on at least one of the plurality of communication devices, wherein the electronic media sharing application provides options to the user for uploading at least one user-selected electronic media;
demonstrating, on a touch-screen display of the at least one of the plurality of communication devices, the plurality of programmable intelligent thermostats positioned within the first and second home environments;

simultaneously uploading the at least one user-selected electronic media to the plurality of programmable intelligent thermostats responsive to a user selection of at least one region of a plurality of regions on the touch-screen display, wherein the user selection comprises a singular tap on the touch-screen display; and wherein each region of the plurality of regions designates the plurality of programmable intelligent thermostats where the at least one user-selected electronic media is uploaded.

14. The method of claim 13 wherein:

responsive to the user selection of the at least one region that is outside of the first and second home environments, the at least one user-selected electronic media is simultaneously uploaded to all the plurality of programmable intelligent thermostats registered with a user account.

15. The method of claim 13 wherein:

responsive to the user selection of the at least one region that is inside the first home environment and outside the two programmable intelligent thermostats, the at least one user-selected electronic media is simultaneously uploaded to the two programmable intelligent thermostats within the first home environment.

16. The method of claim 13, wherein the at least one user-selected electronic media comprises at least one of a textual file, a graphical file, an audio file, and a video file.

17. The method of claim 13, wherein the at least one user-selected electronic media comprises an electronic image.

18. The method of claim 13, wherein the at least one user-selected electronic media is displayed on a display of at least one of the plurality of programmable intelligent thermostats as a background image.

19. A system comprising:

a plurality of programmable intelligent thermostats positioned within at least one of a first home environment and a second home environment;

a plurality of communication devices configured to operate an electronic media sharing application;

at least one server configured to communicate with the plurality of programmable intelligent thermostats and the plurality of communication devices via a wireless network;

wherein a user initiates the electronic media sharing application on at least one of the plurality of communication devices and is provided options for uploading at least one user-selected electronic media;

wherein a touch-screen display of at least one communication device demonstrates the plurality of programmable intelligent thermostats positioned within the first and second home environments;

wherein the at least one electronic image tagged by the user on social media websites is simultaneously uploaded to the plurality of programmable intelligent thermostats responsive to a user selection of at least one region of a plurality of regions on the touch-screen display, wherein the user selection comprises a singular tap on the touch-screen display; and wherein each region of the plurality of regions designates the plurality of programmable intelligent thermostats where the at least one electronic image tagged by the user is uploaded.

* * * * *